United States Patent
Jiang et al.

(10) Patent No.: US 7,068,599 B1
(45) Date of Patent: Jun. 27, 2006

(54) WIRELESS NETWORK HAVING LINK-CONDITION BASED PROXIES FOR QOS MANAGEMENT

(75) Inventors: Zhimei Jiang, Eatontown, NJ (US); Kin K. Leung, Edison, NJ (US)

(73) Assignee: AT&T Corp., New York, NY (US)

( * ) Notice: Subject to any disclaimer, the term of this patent is extended or adjusted under 35 U.S.C. 154(b) by 938 days.

(21) Appl. No.: 09/911,676

(22) Filed: Jul. 24, 2001

Related U.S. Application Data

(60) Provisional application No. 60/220,890, filed on Jul. 26, 2000.

(51) Int. Cl.
*G01R 31/08* (2006.01)
*H04J 1/16* (2006.01)
*H04L 1/00* (2006.01)

(52) U.S. Cl. .................. 370/230.1; 370/231; 370/233; 370/329; 370/352; 370/354; 709/218; 709/219; 709/247

(58) Field of Classification Search ................ 370/229, 370/230.1, 231–233, 329, 352, 353, 354–356, 370/412–418, 468; 709/218, 219, 247
See application file for complete search history.

(56) References Cited

U.S. PATENT DOCUMENTS

| | | | |
|---|---|---|---|
| 5,912,894 A * | 6/1999 | Duault et al. ............... 370/433 |
| 6,147,986 A | 11/2000 | Orsic | |
| 6,223,222 B1 | 4/2001 | Fijolek et al. | |
| 6,226,277 B1 | 5/2001 | Chuah | |
| 6,374,112 B1 * | 4/2002 | Widegren et al. ......... 455/452.2 |
| 6,771,601 B1 * | 8/2004 | Aydemir et al. ............ 370/231 |
| 2001/0032254 A1 * | 10/2001 | Hawkins ..................... 709/219 |

* cited by examiner

*Primary Examiner*—Wellington Chin
*Assistant Examiner*—Raj Jain

(57) ABSTRACT

A wireless network includes a plurality of proxy servers located at various locations to selectively transform data based upon network conditions, such as link congestion. A queueing model for the network can be used to determine optimal operating parameters for the network.

11 Claims, 10 Drawing Sheets

WIRELESS NETWORK HAVING LINK-CONDITION BASED PROXIES FOR QOS MANAGEMENT

CROSS REFERENCE TO RELATED APPLICATIONS

This application claims the benefit of U.S. Provisional Patent Application No. 60/220,890, filed on Jul. 26, 2000, which is incorporated herein by reference.

STATEMENT REGARDING FEDERALLY SPONSORED RESEARCH

Not Applicable.

FIELD OF THE INVENTION

The present invention relates generally to communication networks and, more particularly, to wireless communication networks.

BACKGROUND OF THE INVENTION

As is known in the art, so-called third generation (3G) wireless networks have the potential to provide fast and convenient data access. For example, mobile users will be able to connect to the Internet and office computer systems from virtually anywhere at anytime. There have been many attempts to implement various advanced techniques to improve the capacity and performance of the 3G networks. Despite such attempts, the scarcity of radio resources continues to impose significant limitations on the wireless access experience in terms of data rate.

It would, therefore, be desirable to provide a wireless network that optimizes usage of and protects radio resources during periods of network traffic congestion.

SUMMARY OF THE INVENTION

The present invention provides a wireless network having proxies or proxy servers for controlling the quality of service in wireless networks. The proxies, which can be located at different locations of the network, can perform aggressive content reduction, e.g., by reducing image resolution, to throttle traffic when a radio link is congested. With this arrangement, a user's wireless access experience is enhanced by optimizing use of available bandwidth. While the invention is primarily shown and described in conjunction with content reduction in a wireless network, it is understood that the invention is applicable to networks in general in which it is desirable to transform content in response to link congestion.

In one aspect of the invention, a wireless network includes a plurality of content transformation proxy servers at various locations in the network. In one embodiment, the network includes a plurality of base stations serving mobile stations within respective cells covered by the base stations. The base stations can be coupled to the Internet via network stations, such as Supporting GPRS Service Nodes (SGSNs) coupled to Gateway GPRS Service Nodes (GGSN), in a General Packet Radio Service (GPRS) network. The proxy servers can be located proximate one or more the network components, such as the base stations, the SGSNs, the GGSNs, and the Internet. The proxy servers can reduce content in response to network congestion.

In another aspect of the invention, a queuing model is used to examine performance tradeoffs among system parameters of the network, such as proxy performance in view of feedback control delay between base stations and the proxy. In one embodiment, as an example of content transformation, image compression is used to examine response time and fraction of compression as a function of the control delay.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
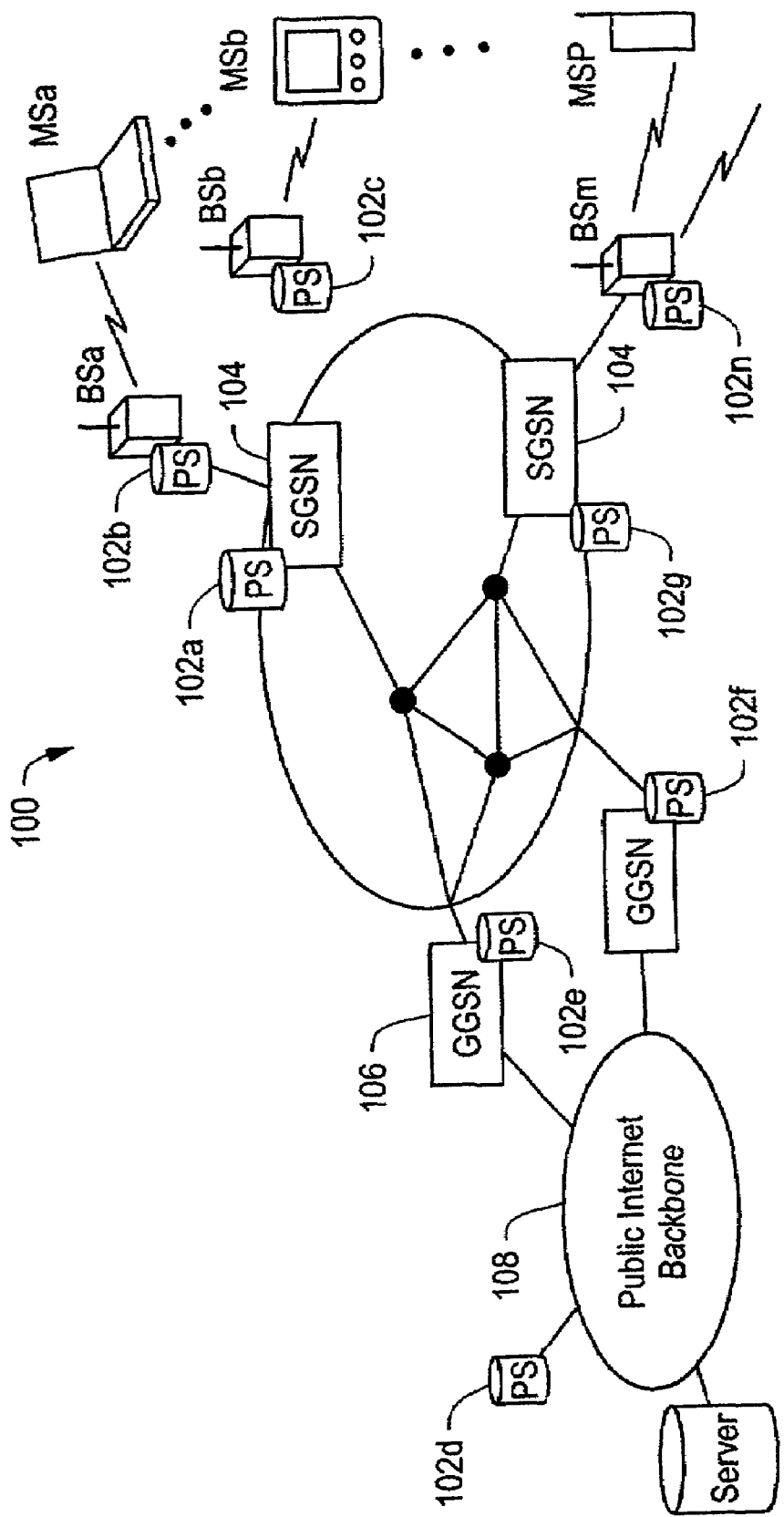
FIG. 1 is a schematic depiction of a wireless network having a plurality of data reduction proxies in accordance with the present invention.

FIG. 1 shows a wireless network 100 having a plurality of proxy servers 102a–N for improving the quality of service (QoS) by transforming data, e.g., reducing data content, during periods of relatively high network congestion. The network 100, which is illustrated as a General Packet Radio Service (GPRS) network, includes a plurality of base stations BSa-M serving mobile stations MSa-P in respective coverage areas, e.g., cells. It is understood that mobile stations MS can include a variety of devices including wireless phones, computers, personal digital assistants (PDAs), etc. The base stations BS are coupled to respective Supporting GPRS Service Nodes (SGSNs) 104, which are served by one or more Gateway GPRS Service Nodes (GGSN) 106. The GGSNs 106 can be coupled to the Internet 108, such as the public Internet backbone, in a manner well known to one of ordinary skill in the art.

The proxy servers 102 can be located at a variety of locations in the network 100. Exemplary locations include proximate the base stations BS, the SGSNs 104, the GGSNs 106, and the Internet 108. Further locations will be readily apparent to one of ordinary skill in the art. In addition, a GPRS network represents an exemplary type of wireless network to which the invention is applicable. It is understood that the invention is suitable for other types of wireless networks.

Figure 2:
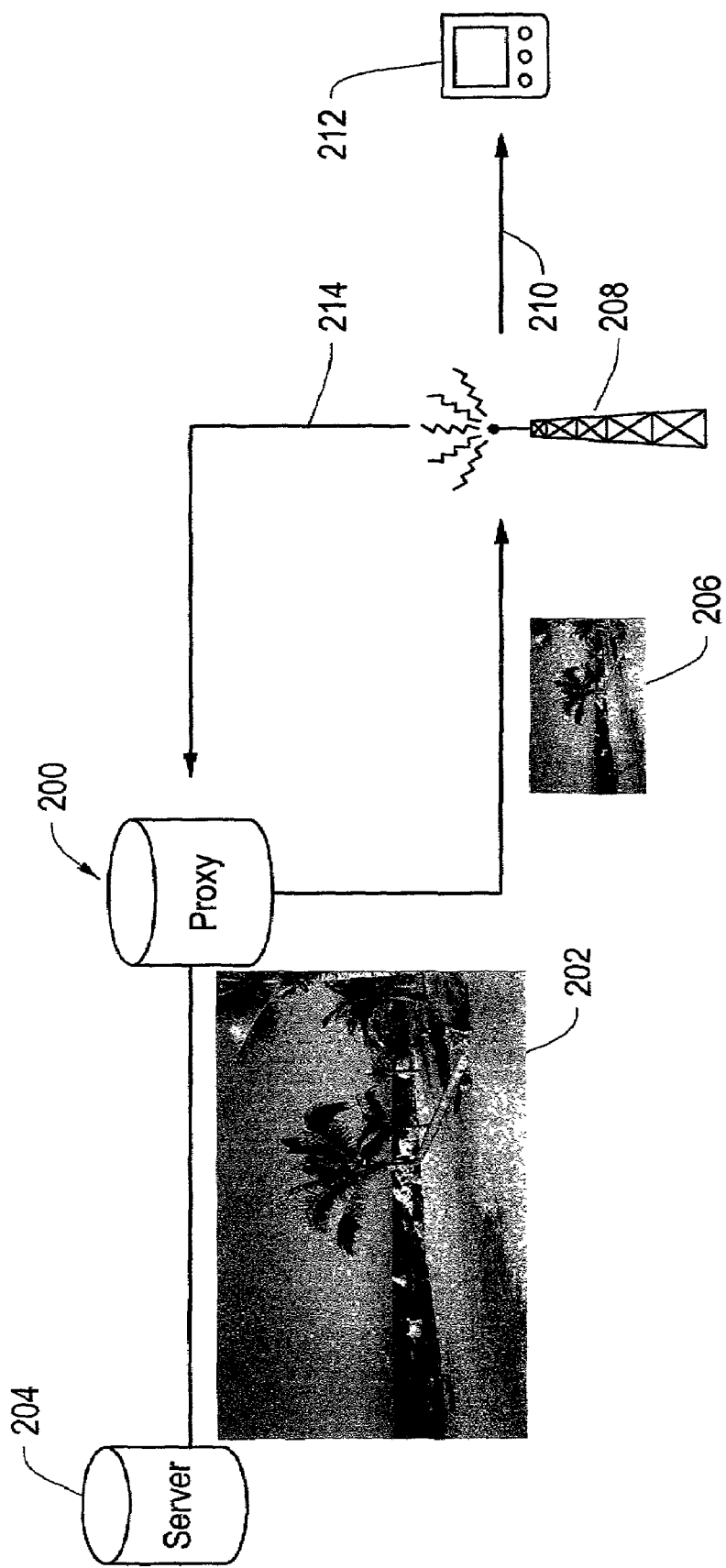
FIG. 2 is a schematic depiction of image reduction by a data reduction proxy in a wireless network in accordance with the present invention.

FIG. 2 shows an exemplary proxy server 200 in accordance with the present invention converting a large high resolution image 202 from a server 204 into a relatively small, low resolution image 206, which is more suitable for transmission by a base station 208 over a radio link 210 and for display on a mobile device 212. Since the radio link 210 is often the "weakest" section of the communication path in terms of bandwidth availability and reliability of data delivery, the proxy server 200 optimizes the usage of the available link bandwidth based upon network congestion level feedback 214, as described more fully below.

It is understood that the proxy servers or proxies of the present invention can rely upon a variety of factors, which can be conflicting factors, for optimal data transformation. Data transformation includes, for example, data compression, transcoding, content removal, and web page version selection (many web sites provide web pages having full images as well as text-based versions for low data rate connections). In one particular embodiment, two factors used to determine the desirable degree of data reduction include response time and resulting data quality. The degree of data compression should be selected to meet the radio bandwidth available to the receiving terminal and its capabilities. The QoS, as perceived by the users, can be further improved if a transcoding operation is dynamically adjusted according to network conditions. That is, whenever the radio link is congested, the proxy reduces the image quality aggressively, resulting in a large data reduction, for reducing the traffic demand on the radio link. If the link is lightly loaded, the proxy does not reduce or marginally reduces the image quality to maintain the original high resolution.

Another factor that can be considered in determining the degree of content reduction is the resulting data quality. Content reduction usually results in degradation of data quality. Thus, there should be performance improvements, such as reduced response time, in order to justify the content reduction. Proxy operation should, therefore, be based upon network conditions.

For example, by reducing the Quality Factor of JPEG images by 25%, 50% and 75%, the image file size can be reduced an average by about 5%, 40% and 60%, respectively. Text files can typically be compressed with about 50% of bandwidth savings.

Having proxies that dynamically adjust operation based on network conditions is advantageous in 3G networks since a radio link will typically be shared by multiple users. When mobile user demand for data approaches the link capacity, the response-time performance can degrade significantly. By reducing traffic through image compression based on network conditions, the proxy maintains satisfactory delay in the system. In addition, network-condition-based content reduction also protects radio resources, since the interference caused by excessive traffic can dramatically reduce the efficiency of the system and further intensify network congestion.

Referring again to FIG. 1, the proxy servers 102 can be located at various locations in the network. For example, a proxy server 102d can be placed inside the Internet, which is relatively far away from the radio link. Proxy servers 102e,f can be located proximate gateway routers within the GGSNs 106, access routers within the SGSNs 104, and the base stations.

Exemplary factors for consideration in proxy server placement and/or activation include performance, system complexity and flexibility, security, and mobility. As proxy servers are moved closer to the mobile stations, the expected response time will decrease, while mobility will trigger more handoffs between proxy servers so as to increase the system overhead. Since the radio link is often the bottleneck in a communication path, proxy servers 102 can be placed close to the base stations BS so that proxy operation can adapt responsively to condition changes in the radio link. The degree of "closeness" is reflected by the control delay, which is defined as the time from when the link congestion is detected to when the base station starts to receive compressed packets from the proxy.

It is understood that a variety of algorithms for link-condition-based proxies can be used. The algorithm described below shows an exemplary technique for using proxy servers to manage quality of service (QoS) in the case of traffic congestion in wireless IP networks. One of ordinary skill in the art will recognize various modifications to the exemplary algorithm without departing from the invention. In addition, while image compression is primarily used, it is understood that the invention is readily applicable to other link-condition-based content reduction techniques including transcoding and content removal.

Figure 3:
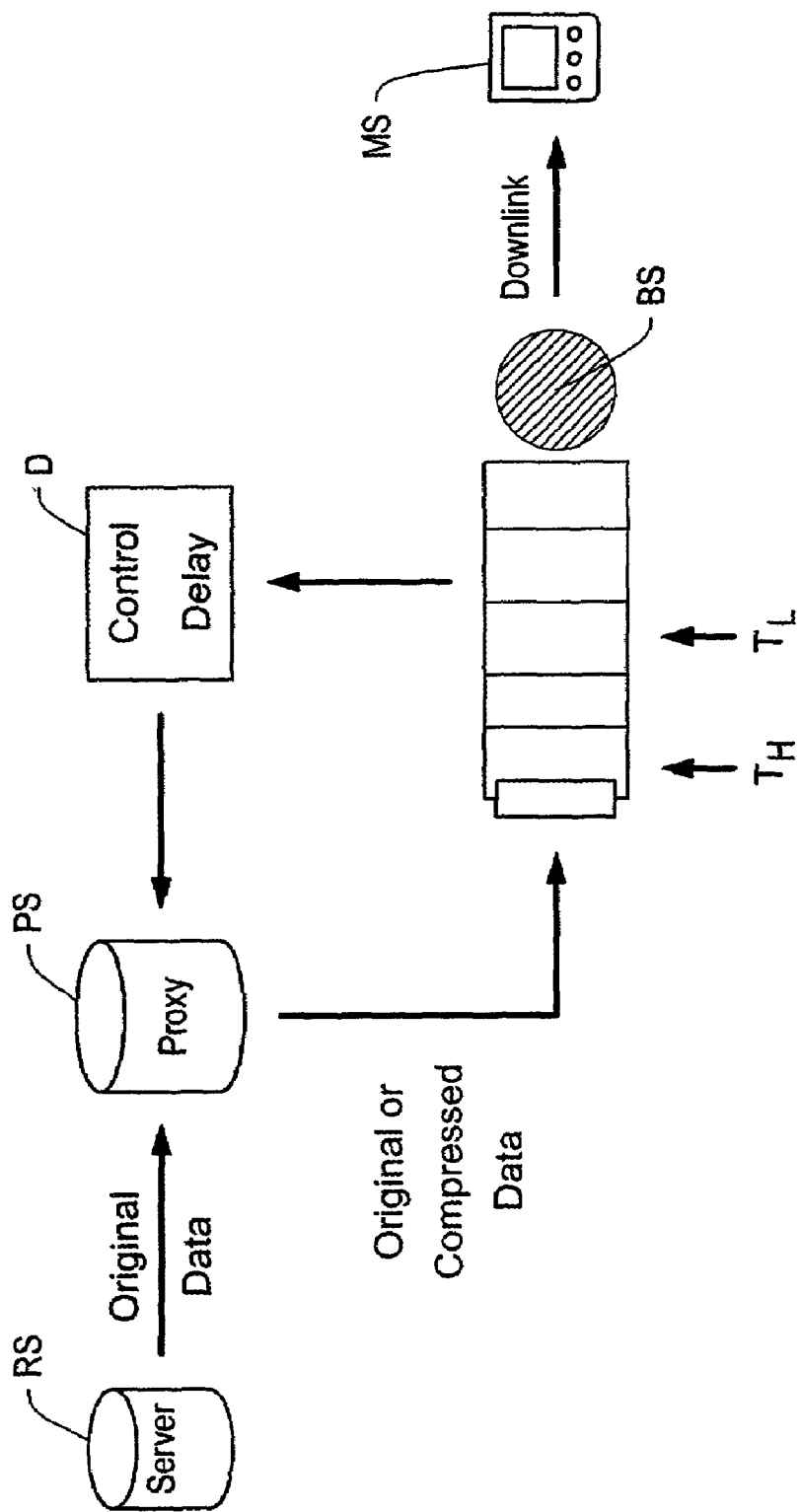
FIG. 3 is a schematic model for data reduction proxies in a wireless network in accordance with the present invention.

FIG. 3 is a schematic diagram of an exemplary content-reduction control mechanism in accordance with the present invention. Since the downlink traffic data rate from a base station BS to a mobile terminal MS is typically much higher than uplink traffic (from mobile terminals to the base station), the radio downlink of the wireless network is primarily described. In general, a mobile station MS requests image files from a remote server RS via the uplink channel (not shown). The remote server RS responds by sending the files to the proxy PS. For simplicity, the main function of the proxy described here is to compress the image files when instructed by the base station BS after detection of network congestion. After possible compression by the proxy, as instructed by the base station BS, image files (compressed or original format) are forwarded to the base station for final delivery to the terminals over the radio link.

The base station BS periodically monitors the amount of data (hereinafter referred to as to the amount of work Q) pending for transmission by the downlink, and compares it with a pre-specified high threshold $T_H$ and a low threshold $T_L$. If the work level is greater than or equal to the high threshold, i.e., $Q \geq T_H$, then the radio link is considered to be congested, and thus the base station BS sends a control message to instruct the proxy to compress image files until further notice. A random, non-zero control delay D is incurred from the time when the message is sent until the proxy PS responds to the instruction. On the other hand, if the comparison indicates that the work level is less than or equal to the high threshold, i.e., $Q \leq T_L$, then the radio link is no longer congested and thus, the base station BS sends another message to the proxy to stop further image compression.

Figure 4:
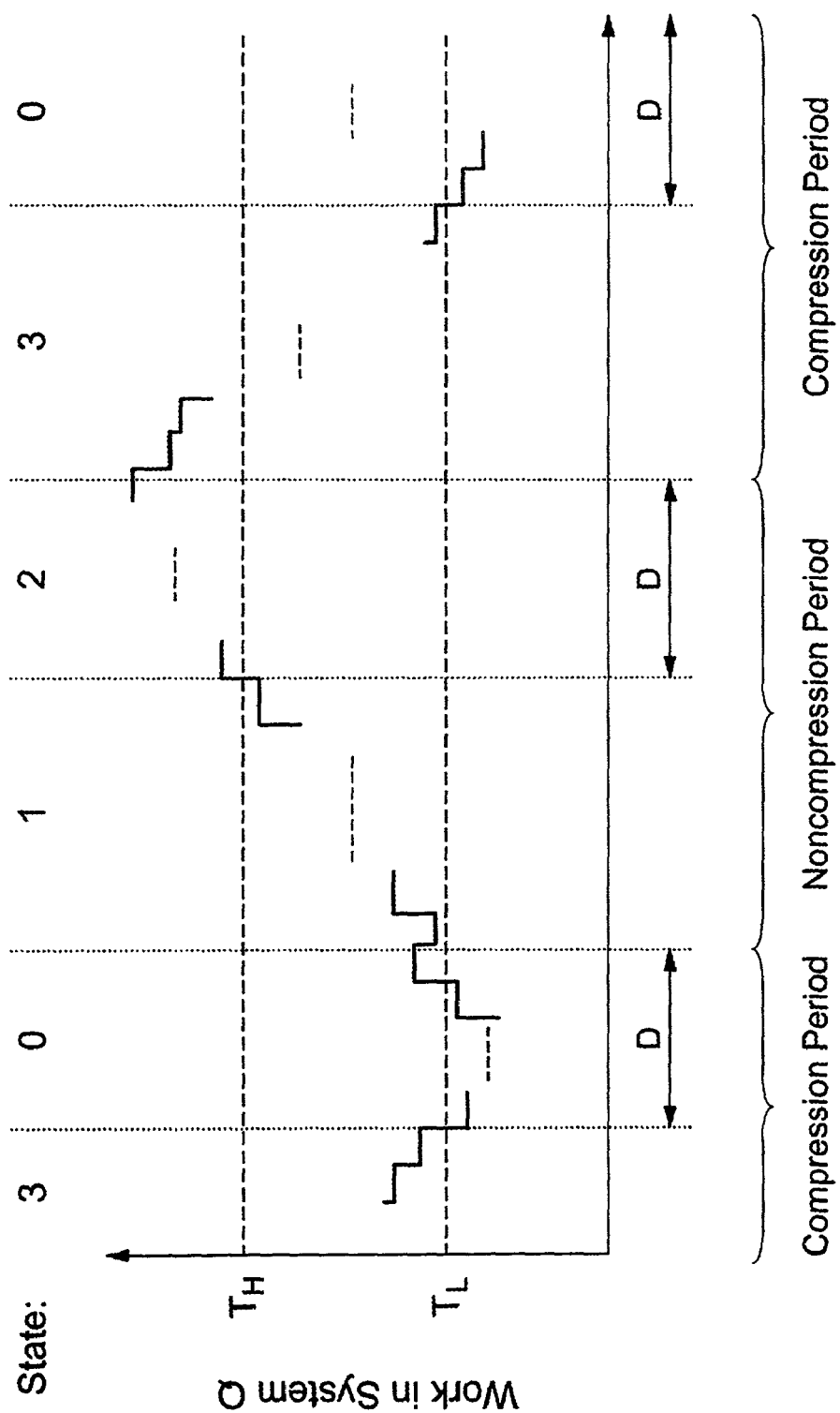
FIG. 4 is a system state transition diagram showing transitions as a level of work (amount of data) is input to a wireless network having data reduction proxies in accordance with the present invention.

As shown in FIG. 4, the downlink status alternates between normal (non-compression) and compression periods showing the relationship between the amount of downlink work Q, i.e. traffic waiting for transmission, and congestion states. Uncompressed image files arrive at the downlink during normal periods and compressed files arrive during compression periods. The downlink has four congestion states indexed from 0 to 3 and the state changes from state i to i+1 in a cyclic manner, where state i+1 becomes 0 when i+1=4. These four states capture the system dynamics with the non-zero delay D. The relationship between the congestion states and normal/compression period is described below.

For example, assume the downlink is currently in state 3, which represents link congestion. Once the base station detects that the amount of work Q drops below the low threshold $T_L$, the downlink enters state 0 as the link is no longer congested and the base station sends a control message to instruct the proxy to stop data compression. To consider the effects of non-zero delay D, the downlink stays in state 0 and enters state 1 at the end of the control delay. As a result, while in state 0, all image files arriving at the downlink are still compressed files as the proxy has not responded to the control message, although the amount of work for the downlink has dropped below the low threshold $T_L$.

During state 1, the amount of work for the downlink continues to increase or decrease, depending on the amount of new work received and the data transmitted by the radio link. Nevertheless, all arrivals are uncompressed in state 1. When there is a large burst of image arrivals, the amount of work at the base station may reach the high threshold $T_H$. At that point, the downlink enters congestion state 2, and the base station sends another control message to request the proxy to resume compression. Again, the purpose of state 2 is to capture the impacts due to the control delay. Arrivals at state 2 continue to be uncompressed files because the proxy has not responded to the compression message yet. The combined time period in state 1 and 2 corresponds to the normal period (also referred to as non-compression period) during which arrivals at the downlink are original (uncompressed) image files.

Similar to the transition from state 0 to 1, the congestion state for the downlink changes from state 2 to 3, when the control message starts to take effect, i.e. when the arrivals become compressed. Compressed files continue to arrive during state 3. When the amount of work drops below the low threshold $T_L$, the downlink leaves state 3 and enters state 0, and then the process continues. The time period during which the downlink is in state 3 and 0 is referred to as the compression period as all arrivals at the downlink during the time period are compressed.

While the invention is described as having high and low thresholds, e.g., $T_H$ and $T_L$, it is understood that a plurality of thresholds can be used to provide more congestion resolution. In addition, the level of congestion and/or the queue size Q can be used to define how aggressively the content is transformed. For example, first second and third thresholds $H_1$, $H_2$, $H_3$ can be utilized as follows.

If $Q<H_1$ then no compression. If the current state is no compression and $H_1<Q<H_2$, then start compression level 1 (reduce image size). If the current state is compression level 1 and $H_2<Q<H_3$, then start compression level 2 (use black and white). If the current state is compression level 2 and $Q>H_3$, then start compression level 3 (remove all images). Corresponding threshold levels can be used to reduce the compression level.

It is understood the number of compression levels and types and combinations of content transformation can be readily varied by one of ordinary skill in the art based upon the requirements of a particular application.

In general, the network condition is defined by a variety of factors. For example, network congestion can be considered from the viewpoint of a single user as well as an aggregation of users. One user can utilize a disproportionate amount of link bandwidth by downloading large, image-intensive web pages for example. The aggregate user data transfer can also degrade performance. In addition, excessive data traffic can result in network congestion. And a poor condition for a link, such as excessive interference, can increase error rates and lower throughput capacity.

In an exemplary embodiment, the thresholds can vary by user. For example, heavy users can be assigned thresholds that serve to transform content based upon the amount of data transfer of those users. Alternatively, thresholds can be based upon a predetermined fee structure such that higher fees provide more lenient content reduction. Further schemes will be readily apparent to one of ordinary skill in the art. In addition, mobile stations served by the network can have varying threshold levels, which can provide corresponding QoS levels.

Control delay is a parameter that can be controlled by the service providers based on a desired level of responsiveness. In one embodiment, the service provider can provide differing user service levels based upon a subscriber fee, e.g., higher fees provide enhanced quality of service. The lower bound of the control delay can be determined by the distance between proxy and the mobile station. In an exemplary embodiment, the control delay can range from tens of milliseconds to tens of seconds.

Thus, the proxy compresses image files when the radio downlink is congested. The data compression reduces the traffic load for the downlink during periods of congestion as compressed files require less service (transmission) time than uncompressed files. As a result, the QoS in terms of file delivery response time can be improved. It is understood that the control delay D depends on the actual location of the proxy and other system details, such as message transport and processing delay in the network. As discussed below, control delay D is one parameter in determining the effectiveness of the QoS control mechanism. In addition, there exist performance tradeoffs between response time and image quality.

In another aspect of the invention, a queueing model provides a basis to measure proxy performance and how that performance is affected by proxy location. As described below, the effectiveness of the network-conditions-based proxy functions cannot be reflected by the delay performance and image quality alone. The network should ensure that the proxy is performing data compression only when the link is congested.

In general, the control delay should be minimized to enable the proxy to transition to the proper state as quickly as possible. More particularly, during periods of congestion content transformation should begin as soon as possible. And upon achieving non-congestion, the proxy should terminate content transformation as soon as possible.

It is understood that network performance can be modeled with a system having the flexibility to place proxies at any location within the network. Given a desired performance level for the system, the appropriate range of the control delay required can be determined for use in locating the proxy servers. Where locations for the proxy servers are limited, achievable levels of performances can be determined and performance limitations can be identified.

The queueing model and solution techniques described below can be used to examine performance characteristics and tradeoffs. Referring again to FIG. 3, certain assumptions for the queueing model can be made.

Assumption One: Depending on the instruction from the base station, the proxy compresses image files arriving from the file server or simply forwards the files to the downlink for transmission without compression. Let the probability generating function (PGF) for the service (transmission) time at radio downlink for compressed and uncompressed files be $X_c(z)$ and $X_u(z)$ respectively, where the service time is assumed to be a positive integer. The compression operation is reflected by the service time chosen from $X_c(z)$ or $X_u(z)$ for the associated files.

Assumption Two: The downlink is modeled as a discrete-time, single-server queue, where image files are transmitted on a first-come-first-served basis. In this model, time is divided into slots. The actual length of each time slot is properly chosen so that each slot represents the desirable, smallest granularity for the amount of work in the queue. Furthermore, the product of the file arrival rate (in terms of number of files per slot) and the average service time for a compressed file is strictly less than 1 so that the queueing model can reach a steady state.

Assumption Three: The number of image files arriving at the downlink queue in each time slot is characterized by a general probability distribution. File arrivals are assumed to actually occur immediately after the beginning of a time slot. As an example, a Poisson distribution is assumed for file arrivals during each slot in the numerical results.

Assumption Four: Let $Q_n$ and $S_n$ be the amount of work in the downlink queue (in units of the number of time slots) and the congestion state at the end of slot n, respectively. A change of congestion state $S_n$ is assumed to occur only at the end of a slot. For modeling tractability, the possible change of congestion state for slot n is assumed to be based on $Q_{n-1}$ of slot n−1. In essence, this causes the control delay to last for at least for one time slot.

Assumption Five: The control delay D is independent of the amount of work for the downlink. Further, for simplicity, the control delay D is assumed to have a geometric distribution with α being the probability that the delay expires in one time slot.

It is understood that the above assumptions are made mainly for tractability reasons and can be relaxed to some extent by introducing additional model complexity. In particular, it is well understood that the packet arrival process is non-renewal, and has long-range dependence in the Internet environment. However, it is understood that the long-range dependence is mainly due to packets of certain applications, such as those with periodic traffic patterns, whereas traffic associated with other applications, such as those with asynchronous access and the image download considered here, do not process such a high auto-correlation property. Thus, in addition to model tractability, the assumption of renewal arrival process can be justified for Web download applications. Nevertheless, the modeling assumptions are reasonable since primary goal is to examine the first-order performance tradeoffs among system parameters. In addition, one of ordinary skill in the art can readily alter the assumptions without departing from the invention.

To analyze this model, the amount of work that arrives in one time slot can be characterized by letting $c_i$ for $i \geq 0$ be the probability that i image files arrive in a time slot. Let $C(z)$ be the PGF for $c_i$'s. That is, $$C(z) = \sum_{i=0}^{\infty} c_i z^i.$$

In addition, A and B can denote the random amount of work arriving in a slot during a normal and compression period respectively. The corresponding PGF's for A and B are $A(z)$ and $B(z)$. It then follows that the random work arriving in the lots can be defined as set forth in Equations 1 and 2 below:

$$A(z) = \sum_{i=0}^{\infty} c_i [X_u(z)]^i = C(X_u(z)) \qquad \text{Eq. (1)}$$

and $$B(z) = \sum_{i=0}^{\infty} c_i [X_c(z)]^i = C(X_c(z)) \qquad \text{Eq. (2)}$$

where $X_u(z)$ and $X_c(z)$ are the PGFs for the service time for the uncompressed and compressed files. As stated in Assumption 3, the numerical examples assume Poisson arrival distribution. In this case, Equations 1 and 2 can be transformed to Equations 3 and 4 below:

$$A(z) = e^{-\lambda(1-X_u(z))} \qquad \text{Eq. (3)}$$

and $$B(z) = e^{-\lambda(1-X_c(z))} \qquad \text{Eq. (4)}$$

Observing the system state defined by $(Q_n, S_n)$ at the end of each time slot n, since the arrival process is renewal and the control delay has a geometric distribution, it is clear that $\{(Q_n, S_n), n \geq 1\}$ form a Markov chain. Let the probability $p_n(i, j) = P[Q_n = i, S_n = j]$, i.e., probability that $Q_n = i$ and $S_n = j$, and its associated PGF $F_n(z_1, z_2) = E[z_1^{Q_n} z_2^{S_n}]$. In addition, we define an indicator $E_n$ for which $E_n = 0$ if the control delay does not expire in slot n, and 1 otherwise. To solve the Markov chain at steady state, a recursive relationship is derived between $F_n$ and $F_{n-1}$. Then the probabilities $p_n(i, j)$ are obtained by an iterative method using discrete Fourier transforms, for example. Considering the possible system states for slot n−1 and using conditional probability, the PGF for slot n is set forth below in Equation 5:

$$F_n(z_1, z_2) = E\left[z_1^{(Q_{n-1}-1)^+ + B} z_2^0\right] P[S_{n-1} = 0 \wedge E_n = 0] + \qquad \text{Eq. (5)}$$
$$E\left[z_1^{(Q_{n-1}-1)^+ + B} z_2^1\right] P[S_{n-1} = 0 \wedge E_n = 1] +$$
$$E\left[z_1^{(Q_{n-1}-1)^+ + A} z_2^1\right] P[S_{n-1} = 1 \wedge Q_{n-1} < T_H] +$$
$$E\left[z_1^{(Q_{n-1}-1)^+ + A} z_2^2\right] P[S_{n-1} = 1 \wedge Q_{n-1} \geq T_H] +$$
$$E\left[z_1^{(Q_{n-1}-1)^+ + A} z_2^2\right] P[S_{n-1} = 2 \wedge E_n = 0] +$$
$$E\left[z_1^{(Q_{n-1}-1)^+ + A} z_2^3\right] P[S_{n-1} = 2 \wedge E_n = 1] +$$
$$E\left[z_1^{(Q_{n-1}-1)^+ + A} z_2^3\right] P[S_{n-1} = 3 \wedge Q_{n-1} < T_L] +$$
$$E\left[z_1^{(Q_{n-1}-1)^+ + A} z_2^0\right] P[S_{n-1} = 3 \wedge Q_{n-1} < T_L]$$

where $(x)^+ = x$ if $x > 0$, and 0 otherwise. The first term on the right hand side (RHS) of (5) corresponds to the condition that the congestion state for slot n−1 is 0 and the control delay has not expired in slot n as indicated by $E_n = 0$. In this case, the amount of work at the end of slot n is equal to that at slot n−1, $Q_{n-1}$, minus one (that is just transmitted by the downlink, if any) plus the new work arrival B. Since the control delay has not expired, the congestion state for slot n remains in state 0. The net result is captured by the first term. The remaining terms in Equation 5 have similar physical interpretations.

As the control delay is independent of the amount of work in the queue as in Assumption 5, Equation 5 can be manipulated to the form expressed in Equation 6 below:

$$F_n(z_1, z_2) = B(z_1)[1 - \alpha + \alpha z_2][p_{n-1}(0, 0) + \quad \text{Eq. (6)}$$

$$\frac{1}{z_1} \sum_{i=1}^{\infty} z_1^i p_{n-1}(i, 0) \Bigg] +$$

$$A(z_1)z_2 \Bigg[ p_{n-1}(0, 1) + \frac{1}{z_1} \sum_{i=1}^{T_H - 1} z_1^i p_{n-1}(i, 1) +$$

$$\frac{z_2}{z_1} \sum_{i=T_H}^{\infty} z_1^i p_{n-1}(i, 1) \Bigg] +$$

$$A(z_1)z_2^2 [1 - \alpha + \alpha z_2][p_{n-1}(0, 2) +$$

$$\frac{1}{z_1} \sum_{i=1}^{\infty} z_1^i p_{n-1}(i, 2) \Bigg] +$$

$$B(z_1) \Bigg[ p_{n-1}(0, 3) + \frac{1}{z_1} \sum_{i=1}^{T_L - 1} z_1^i p_{n-1}(i, 3) +$$

$$\frac{z_2^3}{z_1} \sum_{i=T_L}^{\infty} z_1^i p_{n-1}(i, 3) \Bigg]$$

where $A(z_1)$ and $B(z_1)$ are defined in Equations 1 and 2 above. The physical interpretations for each term on the RHS of Equation 6 can be derived in a manner similar to that described in connection with Equation 5. For example, the last factor of the first term represents the PGF of the amount of work in the downlink queue after transmitting one time slot of work. Since the congestion state is 0, the amount of new work associated with compressed files arriving during slot n is $B(z_1)$, which is given as the first factor. Thus, the product of the first and last factor yields the PGF for the amount of work in the queue at the end of slot n. The second factor in the first term reflects a possible change from the current congestion state of 0 to 1, if the control delay expires with probability a in slot n. Otherwise, with probability 1−α, the congestion state remains at state 0. Other terms in Equation 6 can be interpreted in a similar manner.

Since $F_n(z_1,z_2)$ is the PGF of the probabilities $p_n(i, j)$'s, they are equivalent. Thus, one can see that Equation 6 actually represents a recursive relationship between $F_n(z_1, z_2)$ and $F_{n-1}(z_1,z_2)$. That is, given the probabilities $p_{n-1}(i, j)$ for slot n−1, substituting them into Equation 6 yields the PGF $F_n(z_1, z_2)$ of all $p_n(i, j)$. In other words, the time-dependent state probabilities can be determined as the recursion is executed once for each time slot. Furthermore, since the queueing model has a steady state in accordance with Assumption Two, when n→∞, $F_n(z_1,z_2)=F_{n-1}(z_1,z_2)$. Thus, using Equation 6 as a basis for iterations, an exemplary technique can be applied based on Discrete Fourier Transforms (DFTs) to solve for all probabilities $p_n(i, j)$ with n→∞, as described below.

Since the queueing model has a steady state, the "maximum" amount of work can be estimated for the downlink to be N. If the chosen N value is large enough, the probabilities $p_n(i, j)$ should be very small, e.g. on the order of $10^{-6}$, for all i close to N and j=0 to 3. Then, $F_n(z_1, z_2)$ can be closely approximated as set forth in Equation 7 below:

$$F_n(z_1, z_2) \approx \sum_{i=0}^{N} \sum_{j=0}^{3} z_1^i z_2^j p_n(i, j) \quad \text{Eq. 7}$$

Since the number of all possible system states $(Q_n, S_n)$ now becomes finite due to the truncation of state space, discrete Fourier transforms (DFTs) can be used to represent $F_n(z_1, z_2)$ for computation. To obtain the DFTs, factors can be defined as $\omega_1 = e^{-2\pi j/(N+1)}$ and $\omega_2 = e^{-2\pi j/4}$ where $j=\sqrt{-1}$. (Note that j is also used an integer index.) Let $\{F_n^*(k_1,k_2) | k_1=0$ to $N$, $k_2=0$ to $3\}$ be the DFTs corresponding to $F_n(z_1, z_2)$. By the definition of a DFT, for all $k_1=0$ to N and $k_2=0$ to 3, the result in Equation 8 follows:

$$F_n^*(k_1, k_2) = \sum_{i=0}^{N} \sum_{j=0}^{3} \omega_1^{ik_1} \omega_2^{jk_2} p_n(i, j) \quad \text{Eq. 8}$$

Similarly, the DFTs associated with work A(z) and B(z) in Equations 1 and 2 can be defined and found as $A^*(k_1)$ and $B^*(k_1)$, respectively. As a result, the recursive relationship in PGF in Equation 6 can be converted into one in terms of DFTs as follows below in Equation 9:

$$F_n^*(k_1, k_2) = B^*(k_1)\left[1 - \alpha + \alpha \omega_2^{k_2}\right]\left[p_{n-1}(0, 0) + \quad \text{Eq. 9}\right.$$

$$\frac{1}{\omega_1^{k_1}} \sum_{i=1}^{\infty} \omega_1^{ik_1} p_{n-1}(i, 0) \Bigg] +$$

$$A^*(k_1)\omega_2^{k_2}[p_{n-1}(0, 1) +$$

$$\frac{1}{\omega_1^{k_1}} \sum_{i=1}^{T_H - 1} \omega_1^{ik_1} p_{n-1}(i, 1) +$$

$$\frac{\omega_2^{k_2}}{\omega_1^{k_1}} \sum_{i=T_H}^{\infty} \omega_1^{ik_1} p_{n-1}(i, 1) \Bigg] +$$

$$A^*(k_1)\omega_2^{2k_2}\left[1 - \alpha + \alpha \omega_2^{k_2}\right]\left[p_{n-1}(0, 2) +\right.$$

$$\frac{1}{\omega_1^{k_1}} \sum_{i=1}^{\infty} \omega_1^{ik_1} p_{n-1}(i, 2) \Bigg] +$$

$$B^*(k_1)\omega_2^{3k_2}[p_{n-1}(0, 3) +$$

$$\frac{1}{\omega_1^{k_1}} \sum_{i=1}^{T_L - 1} \omega_1^{ik_1} p_{n-1}(i, 3) +$$

$$\frac{\omega_2^{3k_2}}{\omega_1^{k_1}} \sum_{i=T_L}^{\infty} \omega_1^{ik_1} p_{n-1}(i, 3) \Bigg]$$

Furthermore, one can choose and substitute an initial solution for the probabilities $p_0(i, j)$ with i=0 to N and j=0 to 3, e.g., those corresponding an empty queue, in Equation 9 to obtain the DFTs $F_1^*(k_1,k_2)$. Naturally, inverting these DFTs yields the probabilities $p_1(i, j)$. This process is repeated by substituting the new results into Equation 9 as the argument again. Since the model has a steady state, after a sufficiently large number of iterations, probabilities $p_n(i, j)$ converge to the steady-state solution. A convergent criterion can be that the corresponding new and old probabilities differ less than a very small number, e.g., $10^{-7}$. Once these probabilities are obtained, other important performance measures such as the response-time distribution and fraction of image files compressed become known as discussed below.

To obtain the response-time distribution, the PGF expressed in Equation 10 can be defined as:

$$\hat{F}_n(z_1, j) = \sum_{i=0}^{\infty} z_1^i p_n(i, j) \qquad \text{Eq. 10}$$

where $\hat{F}_n(z_1, j)$ is the PGF for the amount of work for the downlink, given that its congestion state is j at the end of slot n.

Recall that the probability of i file arrivals in a slot is $c_i$. According to the batch-size, the probability of a randomly selected files being the $k^{th}$ file arrival in a slot is given by $$\frac{1}{\overline{c}} \sum_{i=k}^{\infty} c_i.$$

where $\overline{c}$ is the average number of file arrivals per slot. Since the arrival process is independent of the congestion state and the service time is chosen from the PGFs $X_u(z)$ or $X_c(z)$, when the file arrives during a normal (uncompressed) and compression period. In either case, the response time (from the arrival until its transmission completion by the downlink) of a tagged image file is the sum of the amount of work in the queue at the beginning of the slot at which the file arrives and the service time for those files that arrive in the same slot but prior to the tagged file. In terms of PGF, the response time for an arbitrary file is thus given by Equation 11:

$$T(z_1) = [\hat{F}(z_1, 0) + \hat{F}(z_1, 3)] \sum_{k=1}^{\infty} [X_c(z)]^k \frac{1}{\overline{c}} \sum_{i=k}^{\infty} c_i + \qquad \text{Eq. (11)}$$

$$[\hat{F}(z_1, 1) + \hat{F}(z_1, 2)] \sum_{k=1}^{\infty} [X_u(z)]^k \frac{1}{\overline{c}} \sum_{i=k}^{\infty} c_i$$

where $\hat{F}(z_1, j) = \lim_{n \to \infty} \hat{F}_n(z_1, j)$ for j=0 to 3.

After some algebraic manipulation, Equation 11 can be expressed as set forth in Equation 12:

$$T(z_1) = [\hat{F}(z_1, 0) + \hat{F}(z_1, 3)] \frac{1}{\overline{c}} \frac{X_c(z_1)[1 - C(X_c(z_1))]}{1 - X_c(z_1)} + \qquad \text{Eq. (12)}$$

$$[\hat{F}(z_1, 1) + \hat{F}(z_1, 2)] \frac{1}{\overline{c}} \frac{X_u(z_1)[1 - C(X_u(z_1))]}{1 - X_u(z_1)}$$

Since $\hat{F}(z_1,j) = \lim_{n \to \infty} \sum_{i=0}^{N} z_1^i p_n(i, j)$ and all probabilities $p_n(i, j)$ at steady state have been obtained from the iterations, the DFTs $\hat{F}^*(k_1, j)$ corresponding to $\hat{F}(z_1, j)$ can be obtained by Equation 13:

$$\hat{F}^*(k_1, j) = \lim_{n \to \infty} \sum_{i=0}^{N} \omega_i^{ik_1} p_n(i, j) \qquad \text{Eq. (13)}$$

for all $k_1$=0 to N and j=0 to 3. Similarly, the DFTs for $C(X_u(z_1))$ and $C(X_c(z_1))$ can be computed. Finally, the DFTs associated with $T(z_1)$ are obtained. Inverting the $T(z_1)$ DFTs yields the probability distribution for the file response time.

Let the fraction of files compressed by the proxy be denoted by β. By definition, the probability of staying in congestion state j at steady state is $\lim_{n \to \infty} \Sigma_{i=0}^{N} p_n(i, j)$, independent of the congestion state. Hence, we have β= $\hat{F}^*(0,0) + \hat{F}^*(0,3)$, which is known as the last two terms have been found in Equation 13.

Considering the mean time between sending two control messages to reflect the overhead of the control mechanism, it can be observed that two control messages are sent during the time period for the link to go through the whole cycle of 4 congestion states once. Let the average length of such a time period be $\overline{K}$. As $\overline{K}$ includes two average control delays $\overline{D}$, by renewal theory the file compression fraction is β=$2\overline{D}/\overline{K}$. Since two control messages are sent during $\overline{K}$, the mean time between two control messages is $\overline{K}/2$, which is given by $\overline{D}/\beta$, where β has been found above.

The queueing model described above can be used to illustrate the possible performance tradeoffs for the proxy function. In the above numerical examples, the average service time for original (uncompressed) and compressed files are 10 and 7 time slots, respectively. Unless stated otherwise, the thresholds $T_L$ and $T_H$ are set to be 20 and 25, respectively. These parameters are actually derived for a possible operation scenario in the GSM/EDGE system and each time slot corresponds to 20 msec. These parameters are used to consider representative scenarios of downloading images from web servers in the GSM/EDGE system. In the below discussion, D stands for the average control delay, which has a geometric distribution in accordance with Assumption Five.

One goal of content reduction proxies is to reduce the response time involved in downloading data, where the response time is defined as the time from the arrival of an image file (uncompressed or compressed) at the downlink until it is completely transmitted by the link.

Figure 5:
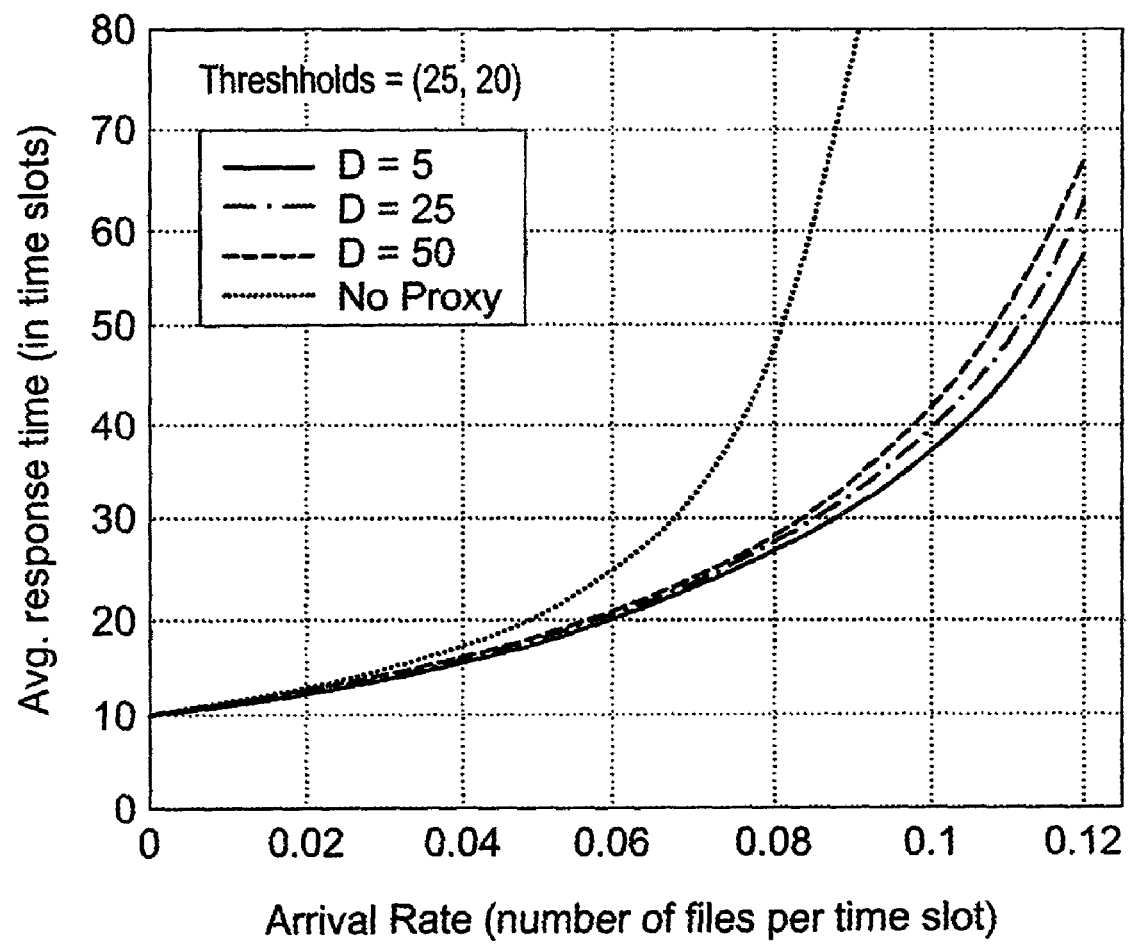
FIG. 5 is a graphical depiction of average response time versus file arrival rates for a wireless network having data reduction proxies in accordance with the present invention.

FIG. 5 shows the average response time for cases with and without the proxy function as a function of file arrival rate at steady state. The average control delay for the cases with proxy is set to 5, 25 and 50 slots respectively. As standard queueing behavior, the delay plots reveal that without proxy, the average response time grows very rapidly when the arrival rate approaches 0.09, which corresponds to 90% link utilization. On the other hand, with proxy, as the traffic load increases, the proxy starts to compress image files. As a result, the reduced traffic load maintains a reasonable response time well beyond the arrival rate of 0.1, where the system without the proxy could have become overloaded and unstable. By performing data compression based on link-congestion condition, the proxy can effectively control the response time and improve the system stability significantly.

When the control delay decreases, the system can react faster to link congestion conditions, thus lowering the response time. As demonstrated in FIG. 5, the decrease in response time is only marginal even when the average control delay is reduced by one order of magnitude from 50 to 5 time slots. However, it cannot be concluded at this point that the control delay has little impact on system performance, as discussed below.

Another performance measure is the percentage of image files compressed by the proxy. Since data reduction often results in loss in display quality, for a given response time, the fewer files that are compressed, the better the proxy performs.

Figure 6:
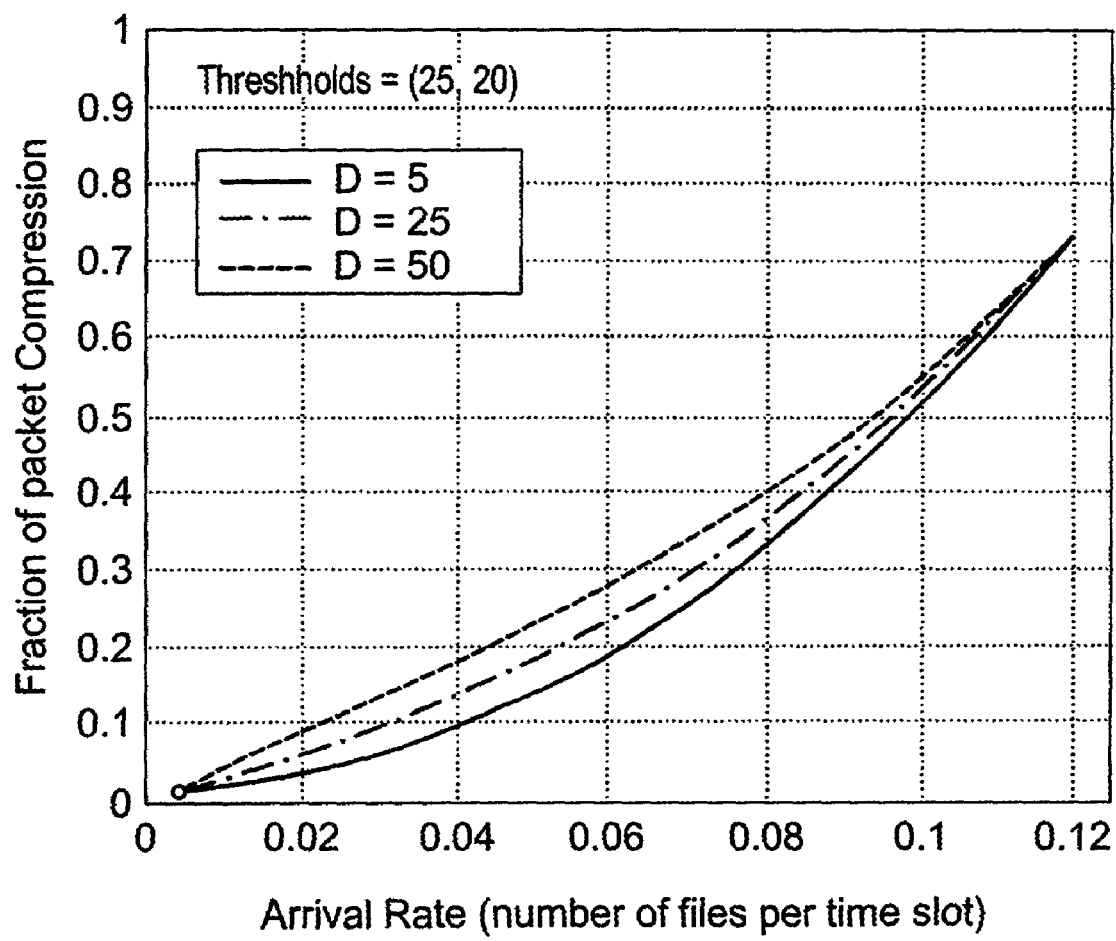
FIG. 6 is a graphical depiction of compression probability versus file arrival rate for a wireless network having data reduction proxies in accordance with the present invention.

FIG. 6 plots the fraction of files compressed by the proxy as a function of file arrival rate at steady state for the same average control delays considered above. It shows that, for a given control delay, the percentage of compression increases with arrival rate. This is expected because high traffic loading causes the radio link to be congested, thus triggering image compression (i.e., degraded image) more often. As can be seen from FIG. 6, the greatest discrepancy in the compression fraction for the selected control delays occurs at medium arrival rates. The reason for this is that, at medium loading, the radio link often moves in and out of the congested state while its buffer occupancy fluctuates between the high and low thresholds $T_H$, $T_L$. And increased control delay causes the control mechanism to be less responsive to changes of the congestion state. As the arrival rate further increases, the link constantly stays in the congestion state (and files are compressed most of the time), thus the impact of the control delay is reduced.

Figure 7:
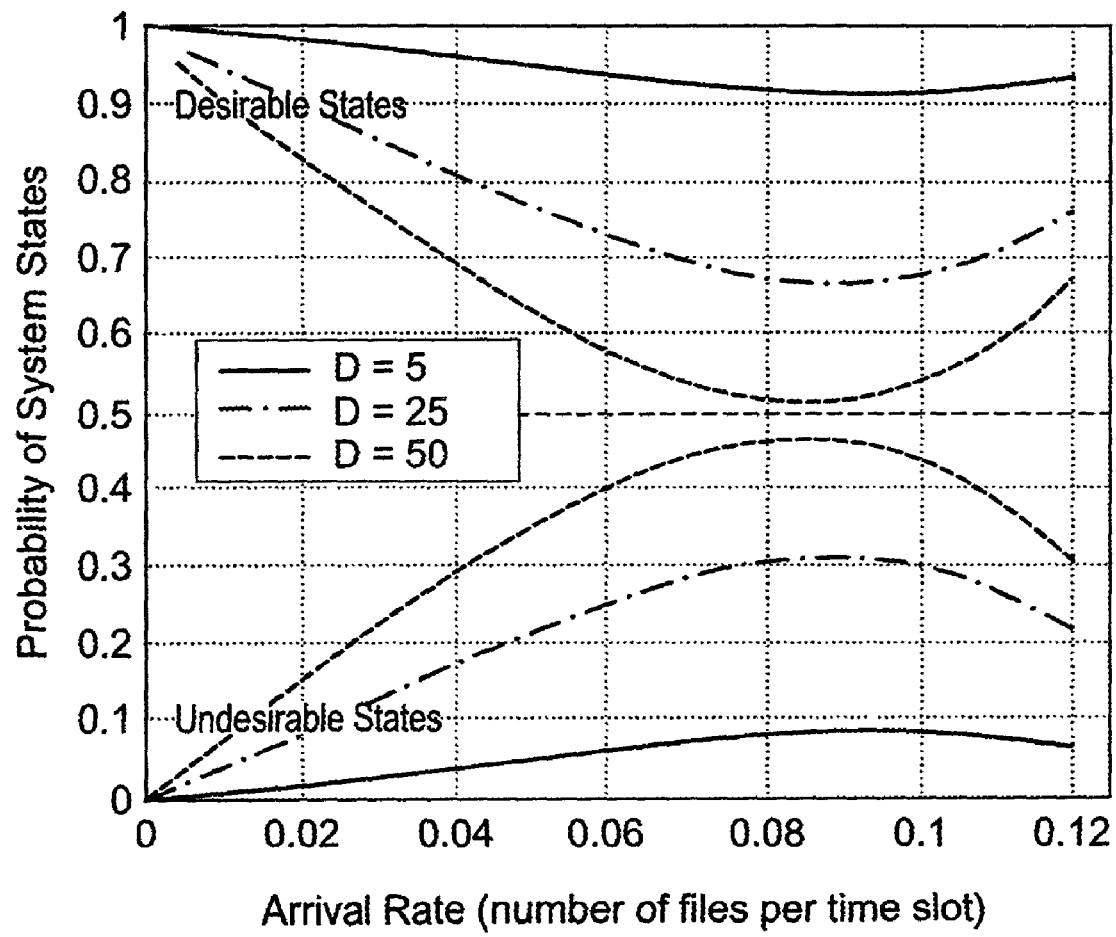
FIG. 7 is a graphical depiction of system state probability versus arrival rate for a wireless network having data reduction proxies in accordance with the present invention.
Figure 8:
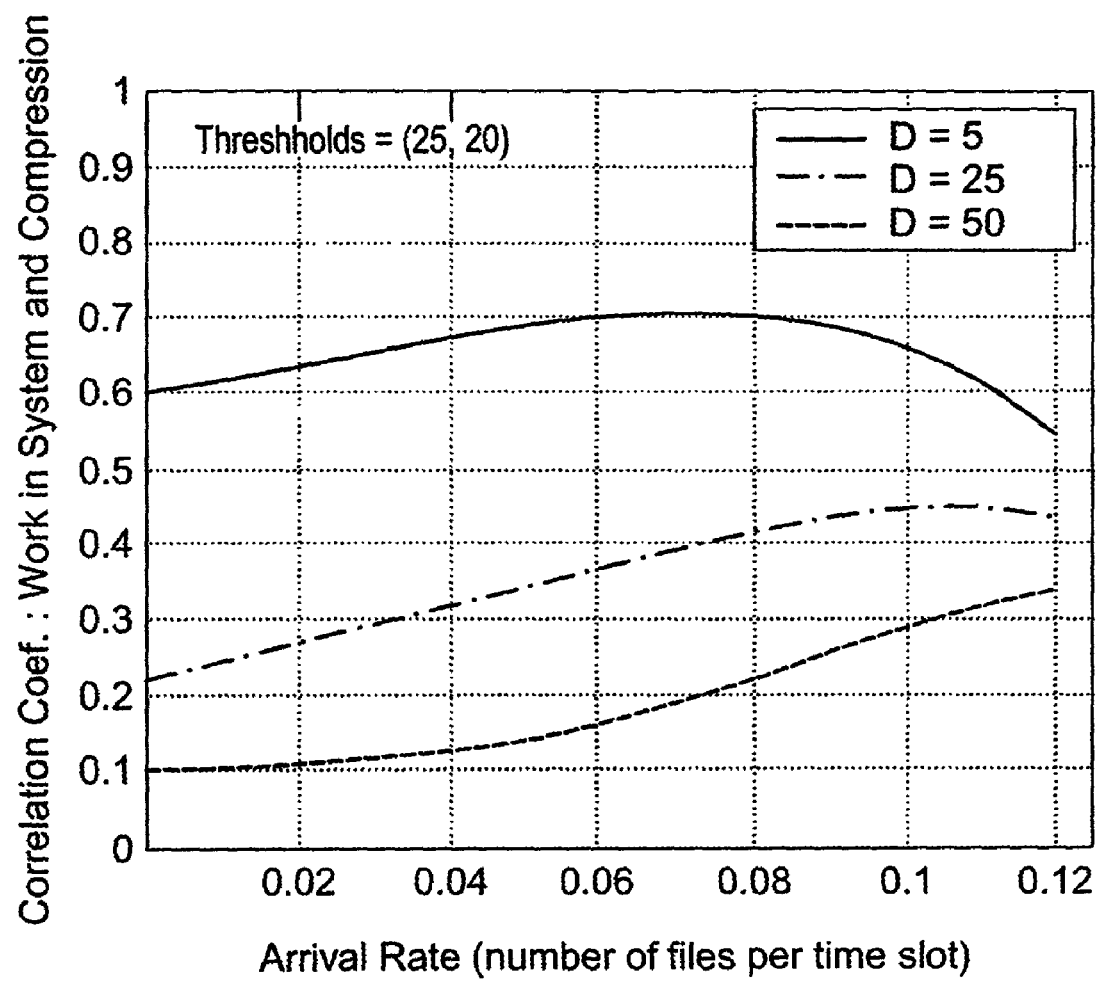
FIG. 8 is a graphical depiction of a correlation coefficient for response time and compression operation for a wireless network having data reduction proxies in accordance with the present invention.

In comparing FIGS. 7 and 8, it can be seen that with a larger control delay, not only do more files experience longer response time, but also more files end up being compressed by the proxy and thus having a lower quality. This may seem to be counter-intuitive at first glance, since more content reduction means less traffic overall, which should lower the response time. This is more closely examined below.

In the above description, performance measures response time and fraction of files compressed were looked at separately. As shown and described above, when the control delay increases, both response time and image quality degrade. What is not captured when considering the performance measures separately is whether the proxy performs data compression when and only when the system is congested. This aspect of proxy performance is examined below by looking at the probability distribution of the congestion states.

As described above, the radio link has four possible congestion states, indexed from 0 to 3. Due to the non-zero control delay, the link stays in state 0 and receives compressed image files, despite the fact that the amount of work for the system has dropped below the low threshold $T_L$. Similarly, the link is in state 2 and receives uncompressed files while the link has been found to be congested. In other words, the proxy does not perform the compression function when it is supposed to during congestion, and vice versa. For this reason, states 0 and 2 can be considered to be undesirable states. In contrast, state 1 and 3 are referred to as the desirable states because uncompressed or compressed files arrive at appropriate times when the link is not congested or congested, respectively. The more the link stays in the desirable states, the more efficiently the proxy performs the QoS control function.

FIG. 7 plots the probability of the system being in the desirable (state 1 or 3) and undesirable (state 0 and 2) states, with an average control delay of 5, 25 and 50 time slots respectively. When the control delay increases, it takes longer for the proxy to react to the changes of link condition, and the system stays in the undesirable states longer than with a lower delay. A striking observation from the figure is that the amount of time that the system spends in the undesirable states increases sharply with the average control delay. For instance, with an average delay of 50 slots, the system can stay at the undesirable states nearly 50% of time at certain loads.

For a large control delay, delayed response to compress images by the proxy causes the downlink queue to build up further than with a smaller control delay. Although the proxy eventually starts file compression, it will take a longer time to clear out the queue to below $T_L$. Thus more files are compressed overall compared to lower control delays. Moreover, the files in the queue experience longer response time. This explains why both compression probability, as well as the response time, go up with increasing control delay.

In addition, because the system also spends more time in state 0 for a large control delay, where files are needlessly compressed by the proxy, these files experience lower response time. So overall, increased control delay does not make a significant impact on the file response time.

To further confirm these observations, the correlation between the amount of work in the system (denoted by Q) at the end of slot prior to the arrival of an arbitrary file and whether or not it is compressed can be examined. Specifically, set a flag G to 1 if the file is compressed, and to zero otherwise. Based on the equilibrium probabilities $p_n(i, j)$ obtained from the model described in detail above, the coefficient of correlation between Q and G for different arrival rates is computed and plotted in FIG. 8. For any given arrival rate, the correlation coefficient for a smaller average control delay is consistently larger than the one with a larger delay, indicating that files are more likely to be compressed when and only when the system is congested.

Figure 9:
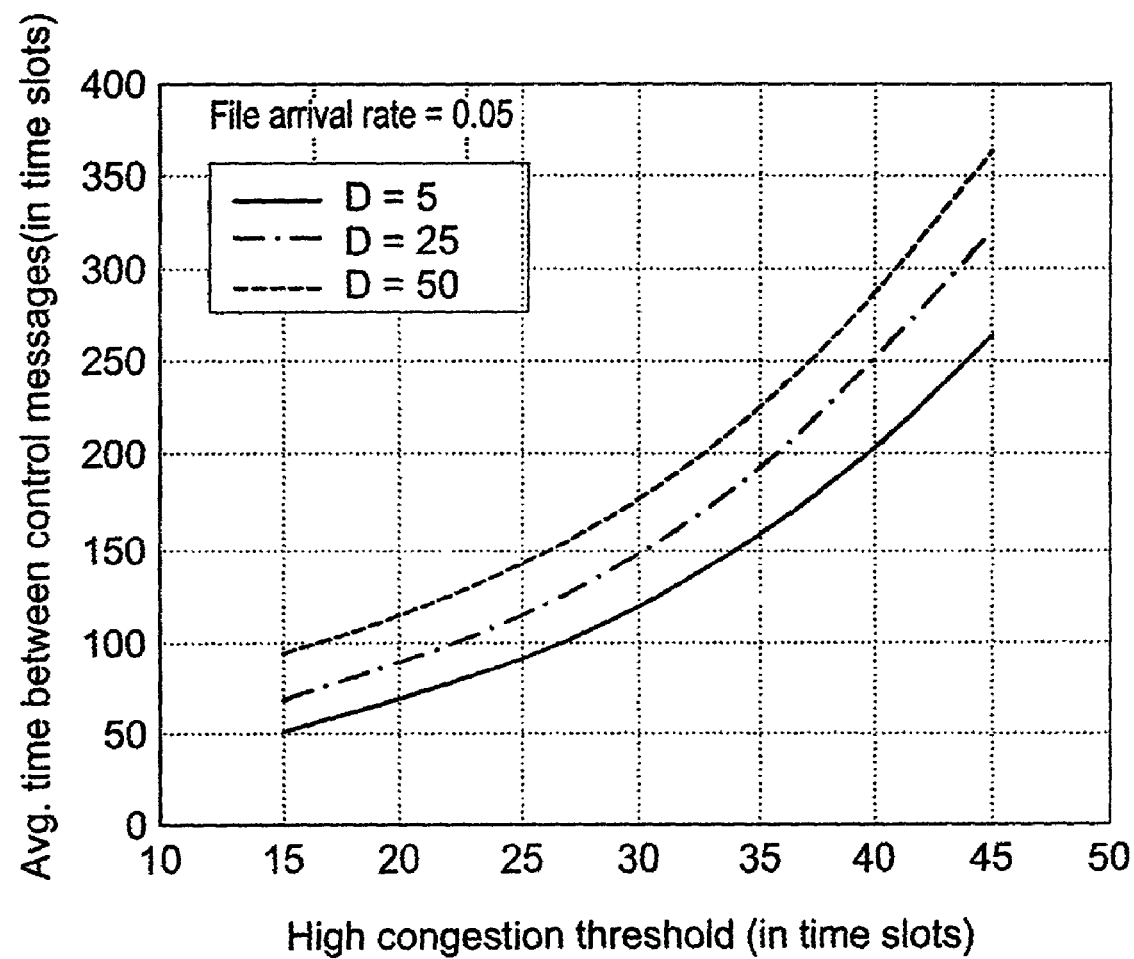
FIG. 9 is a graphical depiction of system control overhead versus control thresholds for a wireless network having data reduction proxies in accordance with the present invention.

Another aspect of system performance is the overhead of sending control messages involved in the mechanism shown in FIG. 3. FIG. 9 shows the average time between two control messages sent from the base station to the proxy as a function of the high threshold $T_H$, where the low threshold $T_L$ is set to be 5 less than the chosen $T_H$ value, when the file arrival rate is 0.05. For any given $T_H$, the mean time between messages increases as the average control delay D increases. This is so because a large control delay makes the time period for the link to go through the whole cycle of 4 congestion states longer. Since there are two control messages sent per cycle (one message upon entering state 0 and 2 respectively), a longer cycle time implies longer mean time between control messages. Furthermore, for a given control delay D value, the mean time between messages increases with $T_H$. Since the file arrival rate is fixed, a larger high threshold $T_H$ requires a longer time to reach the congestion states 2 and 3. As a result, the cycle time increases, and so does the mean time between control messages as well as the control overhead.

Figure 10:
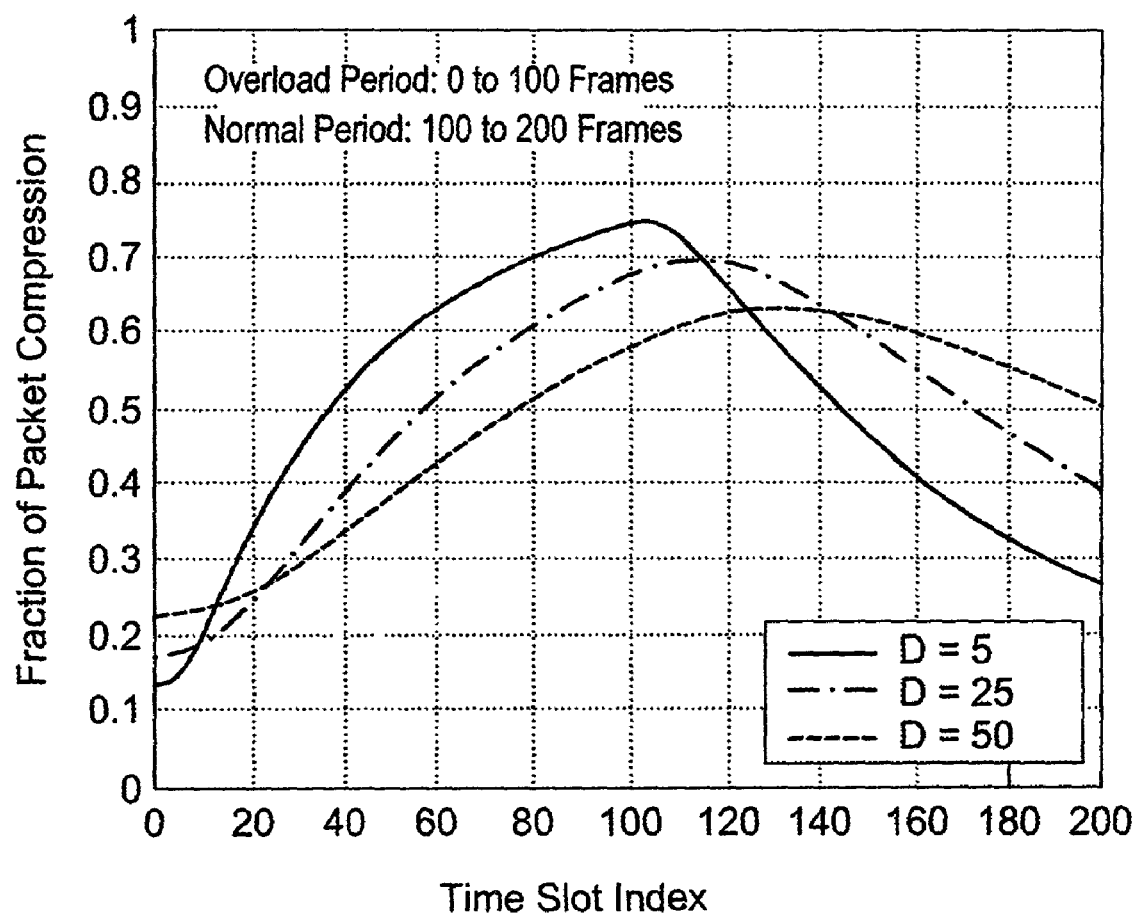
FIG. 10 is a graphical depiction of transient behavior of image compression for wireless network having proxies in accordance with the present invention.

Further, the performance model presented above also enables examination of the transient performance of the proxy server. In particular, consider an overload condition where the downlink has reached a steady state at time slot 0 with file arrival rate of 0.05. From time 1 to 100, the arrival rate is increased three fold to 0.15 and the rate is re-adjusted back to 0.05 after time slot 101. FIG. 10 shows how the probability of file compression changes in time for the average control delay of 5, 25 and 50, respectively. These results reveal that for a small control delay D, the congestion status quickly reaches the proxy. As a result, the proxy starts to compress image files right away following the beginning of the overload period. Similarly, the proxy also responds quickly by stopping unnecessary compression after time slot 101 at which the overload period ends. Results in this figure again show that small control delays help the proxy adapt to network conditions more efficiently.

The present invention provides a wireless network having a plurality of QoS proxies for performing data/content reduction according to network conditions. More particularly, when the radio link is congested, the proxy reduces data aggressively as a means to throttle traffic to control the quality of service.

The present invention also provides a queueing model for analyzing and studying the performance tradeoffs of the proxy system. In particular, the model enables examination of how performance is affected by the control delay between base station and the proxy. Based on numerical results for image compression, it is determined that when compared with no proxy function, the proxy can serve as an efficient control mechanism to improve response time so as to protect scarce radio resources against excessive traffic load. The control mechanism can operate efficiently if the delay is reasonably small, e.g., on the order of 100 msec for 3G wireless networks with GSM/EDGE as the air interface.

Comparing results obtained for different control delays, it is found that both the response time and the average data quality degrade with an increasing control delay. More importantly, studying the response time and compression rate separately for the proxy system is not sufficient for capturing the entire picture regarding proxy performance. Rather, the effectiveness of the control mechanism should be assessed by examining whether the proxy performs data reduction when and only when link congestion occurs. Computing the system-state probabilities and the coefficient of correlation between response time and compression reveal that proxy performance in this respect is less satisfactory with a relatively large control delay. Although proxy adaptation based on the overall link conditions is considered, control delay has similar performance impact for cases where the proxy functions are adjusted according to the link quality for individual mobile users.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for transmitting data through an IP network comprising:
   determining network conditions associated with data being transmitted through the IP network, including determining a level of congestion at a radio link from a base station;
   selectively transforming the data at a proxy server coupled to the base station, based upon the network conditions;
   assigning a first threshold to a first user requesting a disproportionate amount of bandwidth; and
   setting the first threshold based upon expected performance from a queueing model of the network to reduce the level of congestion of the radio link.

2. A method for transmitting data through an IP network comprising:
   determining network conditions associated with data being transmitted through the IP network, including determining a level of congestion at a radio link from a base station;
   selectively transforming the data at a proxy server coupled to the base station, based upon the network conditions; and
   selecting a first threshold for aggregate user link congestion above which data for network users is transformed.

3. The method according to claim 2, further including selecting the first threshold based upon a queueing model of the network.

4. A method for transmitting data through an IP network comprising:
   determining network conditions associated with data being transmitted through the IP network, including determining a level of congestion at a radio link from a base station;
   selectively transforming the data at a proxy server coupled to the base station, based upon the network conditions; and
   selecting a first threshold for link congestion based upon quality of the data link as measured by data rate and/or packet error performance and based upon expected performance from a queueing model of the network.

5. A method for transmitting data through an IP network comprising:
   determining network conditions associated with data being transmitted through the IP network;
   selectively transforming the data at a proxy server coupled to a base station, based upon the network conditions, and
   selecting a control delay corresponding to a delay of a feedback signal from the base station of the radio link containing congestion level information to the proxy server using a queueing model to model network performance based upon the control delay.

6. A method for transmitting data through an IP network comprising:
   determining network conditions associated with data being transmitted through the IP network;
   selectively transforming the data at a proxy server coupled to a base station, based upon the network conditions, and
   establishing a plurality of thresholds for determining when the data transformation is performed and not performed.

7. The method according to claim 6, further including selecting a plurality of data transformation levels corresponding to respective ones of the plurality of thresholds.

8. A method for transmitting data through an IP network comprising:
   determining network conditions associated with data being transmitted through the IP network;
   selectively transforming the data at a proxy server coupled to a base station, based upon the network conditions, and
   establishing a first threshold level above which data transformation is performed.

9. The method according to claim 8, further including establishing a second threshold below which data transformation is not performed.

10. A method for transmitting data through an IP network comprising:
    determining network conditions associated with data being transmitted through the IP network;
    selectively transforming the data at a proxy server coupled to a base station, based upon the network conditions, and
    establishing first, second, third and fourth states for determining whether data transformation is performed.

11. The method according to claim 10, further including transforming data in alternate ones of the states.

* * * * *